(12) United States Patent
Kitagawa et al.

(10) Patent No.: US 11,810,328 B2
(45) Date of Patent: Nov. 7, 2023

(54) IMAGE PROCESSING DEVICE, AIR TREATMENT SYSTEM, IMAGE PROCESSING PROGRAM, AND IMAGE PROCESSING METHOD

(71) Applicant: DAIKIN INDUSTRIES, LTD., Osaka (JP)

(72) Inventors: Keita Kitagawa, Osaka (JP); Atsushi Kondou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/089,048

(22) Filed: Dec. 27, 2022

(65) Prior Publication Data
US 2023/0137712 A1 May 4, 2023

Related U.S. Application Data

(63) Continuation of application No. PCT/JP2021/018854, filed on May 18, 2021.

(30) Foreign Application Priority Data

Jul. 14, 2020 (JP) ................................ 2020-120955

(51) Int. Cl.
G06T 7/80 (2017.01)
G06V 10/10 (2022.01)
H04N 5/64 (2006.01)

(52) U.S. Cl.
CPC ............... *G06T 7/80* (2017.01); *G06V 10/10* (2022.01); *H04N 5/64* (2013.01)

(58) Field of Classification Search
CPC .. G06T 7/80; G06T 7/00; G06V 10/10; H04N 5/64; F24F 11/32; F24F 11/63; F24F 11/49
See application file for complete search history.

(56) References Cited

U.S. PATENT DOCUMENTS 11,305,416 B1 * 4/2022 Correnti ................. B25J 9/0003
2004/0143380 A1 * 7/2004 Stam .................... G06V 20/584
340/467

(Continued)

FOREIGN PATENT DOCUMENTS

JP 2002-279553 A 9/2002
JP 2003-37839 A 2/2003

(Continued)

OTHER PUBLICATIONS

International Search Report, issued in PCT/JP2021/018854, PCT/ISA/210, dated Jul. 6, 2021.

(Continued)

*Primary Examiner* — Molly Wilburn
(74) *Attorney, Agent, or Firm* — Birch, Stewart, Kolasch & Birch, LLP

(57) ABSTRACT

An image processing device includes an estimator (54) configured to estimate a degree of fogging of image data on the basis of the image data, the image data having been acquired by an imaging device (41) capturing an image of an imaging target (T) disposed in a casing (25) of an air treatment device (10); and a determiner (55) configured to determine output image data on the basis of the degree of fogging of the image data estimated by the estimator (54), the output image data being image data to be output.

16 Claims, 11 Drawing Sheets

(56) References Cited

U.S. PATENT DOCUMENTS

| | | | |
|---|---|---|---|
| 2014/0055641 A1* | 2/2014 | Jo | H04N 23/70 |
| | | | 348/231.3 |
| 2014/0115958 A1* | 5/2014 | Helene | A01G 9/24 |
| | | | 47/17 |
| 2017/0109612 A1 | 4/2017 | Mittal et al. | |
| 2017/0240138 A1* | 8/2017 | Mori | H04N 7/183 |
| 2020/0031196 A1* | 1/2020 | Chevers | B60H 1/00828 |
| 2020/0173670 A1 | 6/2020 | Suzuki et al. | |
| 2020/0198548 A1* | 6/2020 | Ohtaki | B60S 1/54 |
| 2020/0198582 A1* | 6/2020 | Kudo | B60S 1/026 |
| 2020/0248918 A1 | 8/2020 | Handa et al. | |

FOREIGN PATENT DOCUMENTS

| | | |
|---|---|---|
| JP | 2007-46864 A | 2/2007 |
| JP | 2008-51694 A | 3/2008 |
| JP | 2017-40425 A | 2/2017 |
| JP | 2019-39658 A | 3/2019 |
| JP | 2020-139664 A | 9/2020 |
| WO | WO 2018/167974 A1 | 9/2018 |

OTHER PUBLICATIONS

Written Opinion of the International Searching Authority, issued in PCT/JP2021/018854, PCT/ISA/237, dated Jul. 6, 2021.

International Preliminary Report on Patentability and English translation of the Written Opinion of the International Searching Authority for International Application No. PCT/JP2021/018854, dated Jan. 26, 2023.

Extended European Search Report for European Application No. 21843063.5, dated Jul. 26, 2023.

Wang et al. "Haze Detection and Haze Degree Estimation Using Dark Channels and Contrast Histograms", 2015 10th International Conference on Information, Communications and Signal Processing (ICICS), IEEE Processing, 2015, pp. 1-5.

\* cited by examiner

| LEVEL OF DEGREE OF FOGGING | STATES |
|---|---|
| 0 | NO FOGGING |
| 1 | FOGGING NOT SEVERE TO HINDER INSPECTION |
| 2 | FOGGING SEVERE TO HINDER INSPECTION |
| 3 | HIGHLY SEVERE FOGGING |

IMAGE PROCESSING DEVICE, AIR TREATMENT SYSTEM, IMAGE PROCESSING PROGRAM, AND IMAGE PROCESSING METHOD

CROSS REFERENCE TO RELATED APPLICATIONS

This application is a Continuation of PCT International Application No. PCT/JP2021/018854 filed on May 18, 2021, which claims priority under 35 U.S.C. § 119(a) to Patent Application No. 2020-120955 filed in Japan on Jul. 14, 2020, all of which are hereby expressly incorporated by reference into the present application.

TECHNICAL FIELD

The present disclosure relates to an image processing device, an air treatment system, an image processing program, and an image processing method.

BACKGROUND ART

Patent Document 1 discloses an air treatment device configured to acquire image data of components in a casing, using an imaging device. The state of the components can be grasped by an operator, for example, by checking the image data acquired by the imaging device.

CITATION LIST

Patent Document

Patent Document 1: Japanese Unexamined Patent Publication No. 2019-39658

SUMMARY

A first aspect is directed to an image processing device, including: an estimator (54) configured to estimate a degree of fogging of image data on the basis of the image data, the image data having been acquired by an imaging device (41) capturing an image of an imaging target (T) disposed in a casing (25) of an air treatment device (10); and a determiner (55) configured to determine output image data on the basis of the degree of fogging of the image data estimated by the estimator (54), the output image data being image data to be output.

DESCRIPTION OF EMBODIMENTS

An embodiment of the present disclosure will be described below with reference to the drawings. The following embodiment is merely an exemplary one in nature, and is not intended to limit the scope, applications, or use of the present disclosure.

First Embodiment

An air treatment system (1) according to a first embodiment will be described.

<General Configuration of Air Treatment System>

Figure 1:
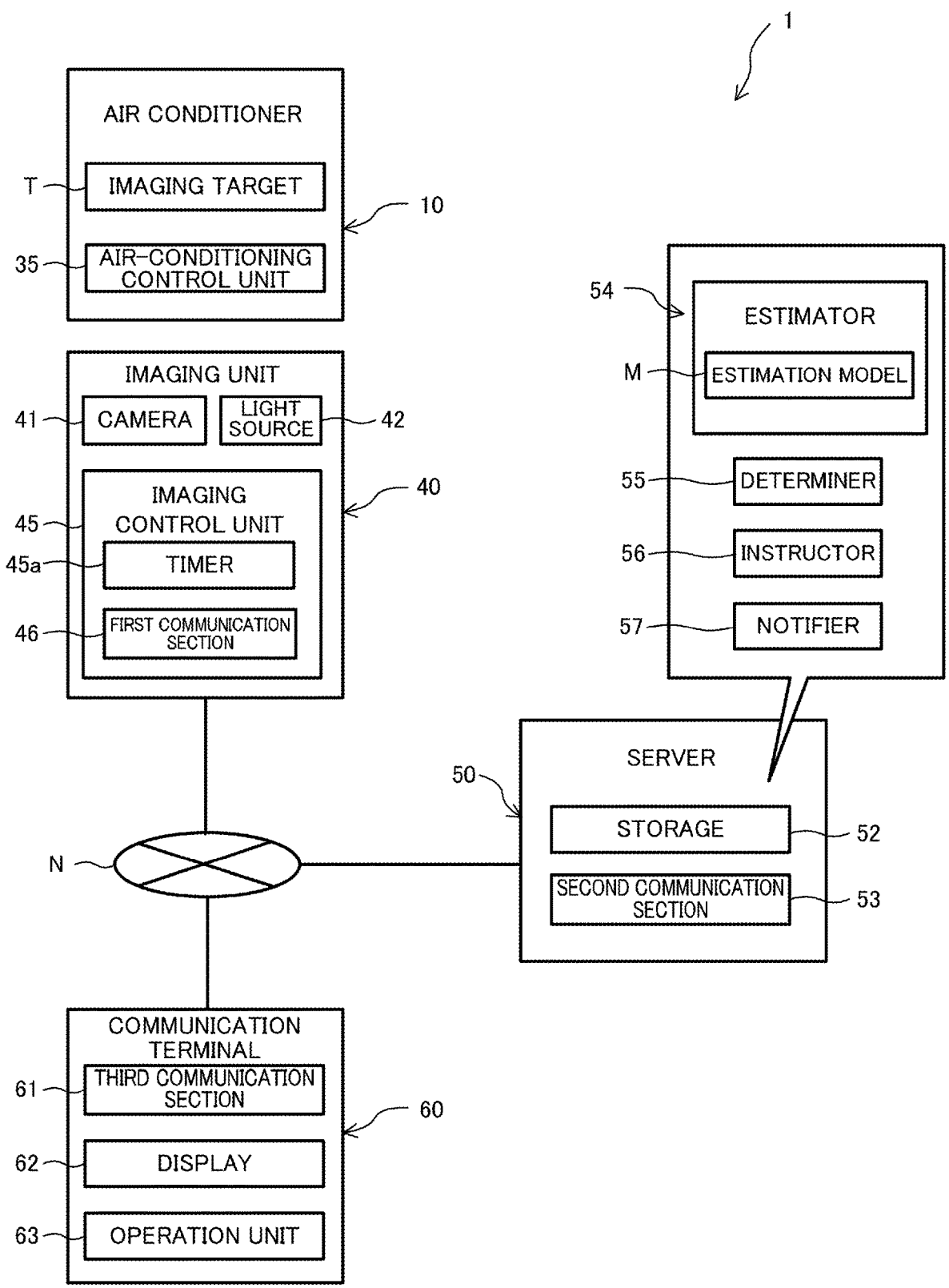
FIG. 1 is a block diagram illustrating a general configuration of an air treatment system according to a first embodiment.

As illustrated in FIG. 1, the air treatment system (1) of the first embodiment includes an air conditioner (10), an imaging unit (40), and a server (50). The imaging unit (40) and the server (50) are connected to the Internet (N). A communication terminal (60) of an operator is connected to the Internet (N). Examples of the operator include those who maintain the air conditioner (10), who manage the air conditioner (10), and who are a user of the air conditioner (10). Examples of the communication terminal (60) include a personal computer, a smartphone, a tablet terminal, and a mobile phone.

According to the air treatment system (1) of the first embodiment, the imaging unit (40) captures an image of an imaging target (T) of the air conditioner (10). The image data acquired by the imaging unit (40) is transmitted to the server (50) via the Internet (N). The operator can check the image data outputted from the server (50) visually using the communication terminal (60).

<General Configuration of Air Conditioner>

The air conditioner (10) conditions air in an indoor space, which is a target space. The air conditioner (10) adjusts the temperature of room air (RA) in the indoor space. The air conditioner (10) supplies temperature-adjusted air as supply air (SA) into the indoor space. The air conditioner (10) performs a cooling operation and a heating operation.

Figure 2:
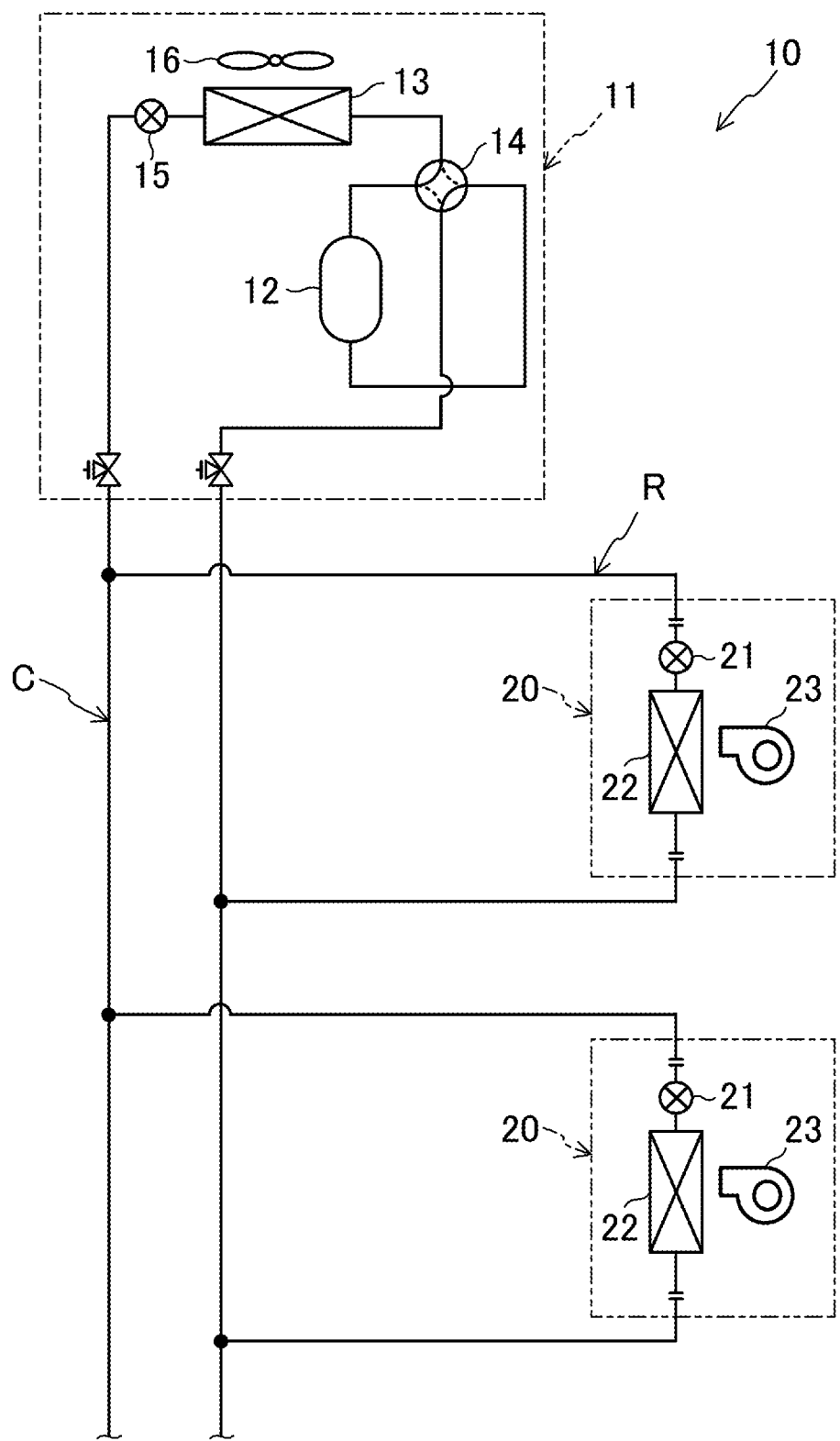
FIG. 2 is a piping system diagram illustrating an air conditioner according to the first embodiment.

As illustrated in FIG. 2, the air conditioner (10) is of a multiple type. The air conditioner (10) includes an outdoor unit (11) and a plurality of indoor units (20). The air conditioner (10) may be of a pair type including one outdoor unit (11) and one indoor unit (20). The outdoor unit (11) is installed in the outdoor space. The indoor units (20) are installed in the indoor space. More specifically, the indoor units (20) are installed in a space behind a ceiling facing the indoor space. The air conditioner (10) includes a refrigerant circuit (R). The refrigerant circuit (R) is configured by connecting the outdoor unit (11) and the plurality of indoor units (20) via a connection pipe (C).

The refrigerant circuit (R) includes a refrigerant. The refrigerant circuit (R) performs a vapor compression refrigeration cycle by circulating the refrigerant. The refrigerant circuit (R) includes a compressor (12), an outdoor heat exchanger (13), an indoor expansion valve (21), and an indoor heat exchanger (22). The refrigerant circuit (R) has a four-way switching valve (14) and an outdoor expansion valve (15).

The outdoor unit (11) is provided with the compressor (12), the outdoor heat exchanger (13), the four-way switching valve (14), and the outdoor expansion valve (15). The outdoor unit (11) is provided with an outdoor fan (16). The compressor (12) compresses the refrigerant. The compressor (12) has an electric motor, the number of rotations of which is variable. The outdoor heat exchanger (13) performs heat exchange between the refrigerant and outdoor air. The outdoor expansion valve (15) is an electronic expansion valve that decompresses the refrigerant. The outdoor fan (16) transfers the outdoor air passing through the outdoor heat exchanger (13).

The four-way switching valve (14) switches over between a first state indicated by the solid curves in FIG. 2 and a second state indicated by the broken curves in FIG. 2. The four-way switching valve (14) in the first state makes a discharge portion of the compressor (12) and a gas end of the outdoor heat exchanger (13) communicate with each other, and makes a suction portion of the compressor (12) and a gas end of the indoor heat exchanger (22) communicate with each other. The four-way switching valve (14) in the second state makes the discharge side of the compressor (12) and the gas end of the indoor heat exchanger (22) communicate with each other, and makes the suction side of the compressor (12) and the gas end of the outdoor heat exchanger (13) communicate with each other.

Each of the indoor unit (20) is provided with the indoor expansion valve (21) and the indoor heat exchanger (22). The indoor unit (20) is provided with an indoor fan (23). The indoor expansion valve (21) is an electronic expansion valve that decompresses the refrigerant. The indoor fan (23) transfers room air passing through the indoor heat exchanger (22).

<Indoor Unit>

A configuration of the indoor unit (20) will be described with reference to FIGS. 3 and 4. In the following description, the terms "front," "rear," "right," "left," "upper," and "lower" are based on a case where a front panel (25a) of a casing (25) is viewed from the front.

The indoor unit (20) includes a casing (25), the indoor fan (23), an indoor heat exchanger (22), a tray (26), and a pump (27). The casing (25) is installed behind the ceiling. The indoor fan (23), the indoor heat exchanger (22), the tray (26) and the pump (27) are disposed inside the casing (25).

<Casing>

The casing (25) has a shape of a rectangular parallelepiped hollow box. The casing (25) has an intake port (28) in a right-side panel (25b) thereof. The intake port (28) is connected with a suction duct (not shown). An inflow end of the suction duct communicates with the indoor space. The casing (25) has a blow-out port (29) in a left-side panel (25c) thereof. The blow-out port (29) is connected with a blow-out duct (not shown). An outflow end of the blow-out duct communicates with the indoor space.

An air flow path (30) is formed in the casing (25) from the intake port (28) to the blow-out port (29). The indoor fan (23) and the indoor heat exchanger (22) are disposed in the air flow path (30).

The front panel (25a) of the casing (25) faces a maintenance space. The maintenance space is a workspace. An inspection hole (31) is formed in the front panel (25a). An inspection cover (32) is detachably attached to the inspection hole (31).

The tray (26) and the pump (27) are disposed behind the inspection hole (31). The tray (26) and the pump (27) are exposable to the outside of the casing (25) through the inspection hole (31).

<Indoor Fan>

The indoor fan (23) is disposed upstream of the indoor heat exchanger (22) in the air flow path (30). The indoor fan (23) corresponds to a fan of the present disclosure. The indoor fan (23) is a sirocco fan. The indoor fan (23) transfers air in the air flow path (30).

<Indoor Heat Exchanger>

The indoor heat exchanger (22) is a fin-and-tube heat exchanger. The indoor heat exchanger (22) is an air heat exchanger that allows heat exchange between the air in the air flow path (30) and the refrigerant. The indoor heat exchanger (22) is disposed with longitudinal direction of fins tilted (see FIG. 4).

Folded portions of a heat transfer tube (not shown) of the indoor heat exchanger (22) and a flow divider (not shown) connected to the indoor heat exchanger (22) are disposed in a first space (S1) to be described in detail later.

<Tray>

The tray (26) is disposed below the indoor heat exchanger (22). The tray (26) is a pan that is open upward. The tray (26) receives condensed water generated in the vicinity of the indoor heat exchanger (22). The tray (26) is a component in the casing (25). The tray (26) is an imaging target (T) of a camera (41). The tray (26) is made of a resin material.

<Pump>

The pump (27) is disposed in the tray (26). The pump (27) is used to discharge water in the tray (26). A drain pipe (27a) is connected to an upper portion of the pump (27). The water sucked into the pump (27) is discharged to the outside of the casing (25) via the drain pipe (27a). The pump (27) is a component in the casing (25). The pump (27) is an imaging target (T) of the camera (41).

<Partition>

The indoor unit (20) has a partition that defines a front space (S1). As illustrated in FIGS. 3 and 4, the partition includes a first partition plate (25d), a second partition plate (25e), and a third partition plate (25f).

The first partition plate (25d) extends from the front panel (25a) of the casing (25) along the right edge of the indoor heat exchanger (22). In other words, the first partition plate (25d) extends across the air flow path (30) from the front panel (25a) of the casing (25). The first partition plate (25d) extends from the bottom plate to the top panel of the casing (25).

The second partition plate (25e) covers a front side of a space (a downstream-side air flow path (30b)) on the downstream side (the left side in FIG. 4) of the indoor heat exchanger (22) in the air flow path (30). The second partition plate (25e) has a substantially rectangular shape. The second partition plate (25e) extends from the bottom plate to the top panel of the casing (25). The second partition plate (25e) is substantially flash with the front end of the indoor heat exchanger (22). The second partition plate (25e) separates the downstream-side air flow path (30b) and the front space (S1) from each other.

A space (an upstream-side air flow path (30a)) on the upstream side (the right side in FIG. 4) of the indoor heat exchanger (22) in the air flow path (30) is not covered with a partition. The upstream-side air flow path (30a) and the front space (S1) therefore communicate with each other.

The third partition plate (25f) is provided on the left-side panel (25c) of the casing (25). The third partition plate (25f) is closer to the front than the blow-out port (29).

The front space (S1) is defined by the first partition plate (25d), the second partition plate (25e), and the third partition plate (25f). The front space (S1) is a first space different from the air flow path (30). The front space (S1) communicates with the upstream-side air flow path (30a) of the air flow path (30) and is blocked from the downstream-side air flow path (30b). Air in the upstream-side air flow path (30a) flows into the front space (S1). However, air tends to remain in the front space (S1) more than in the air flow path (30).

<Electric Component Box>

Figure 3:
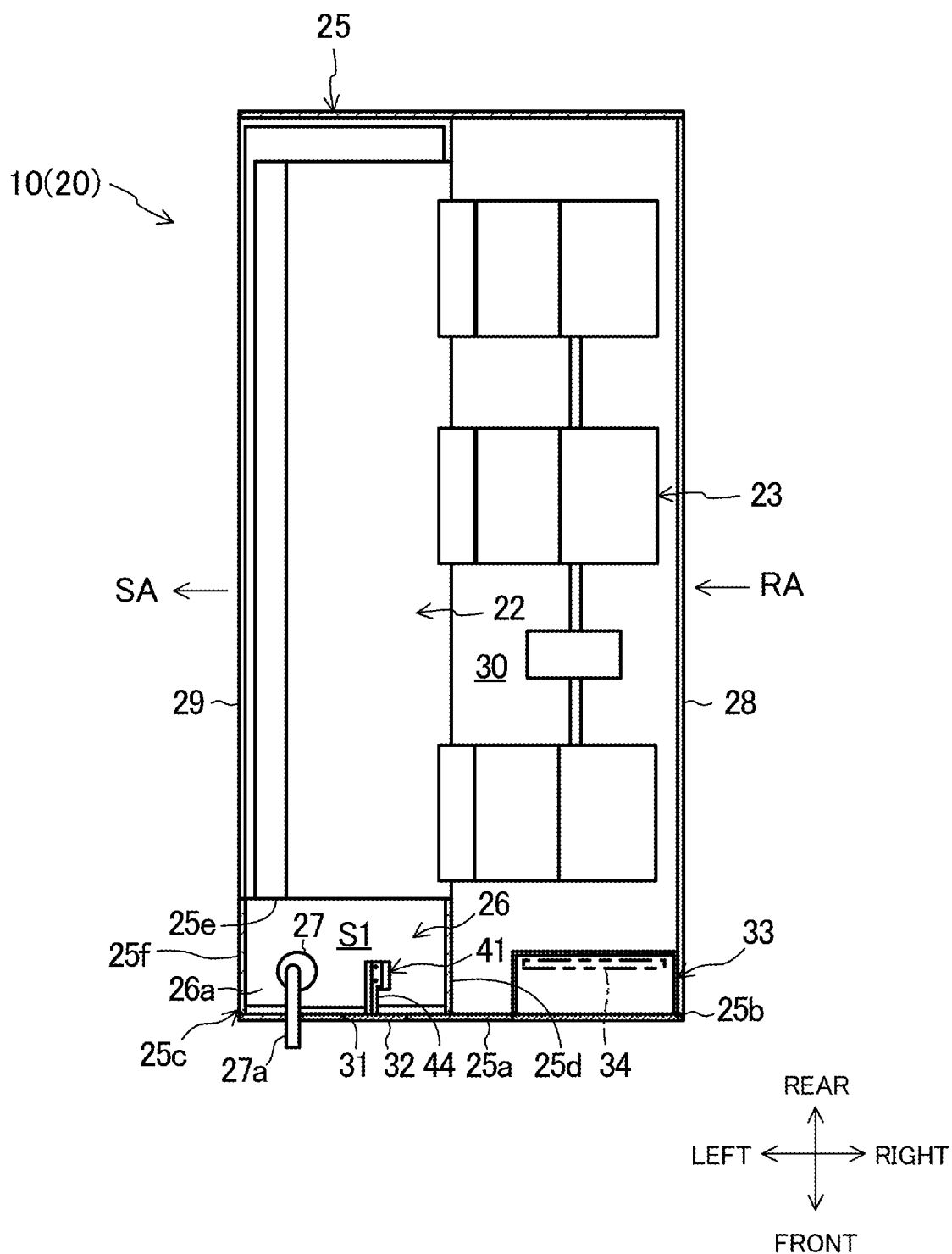
FIG. 3 is a diagram illustrating a plan view of an indoor unit according to the first embodiment.
Figures 4, 5:
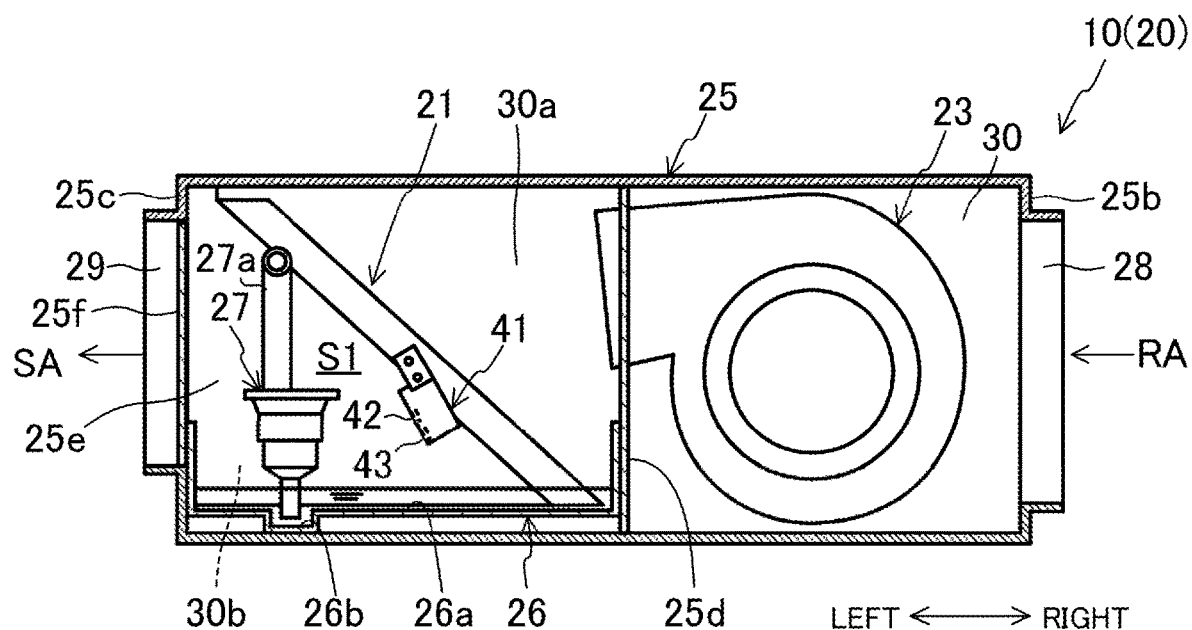
FIG. 4 is a diagram illustrating the inside of the indoor unit according to the first embodiment, as viewed from the front.
FIG. 5 is a table for explaining levels of the degree of fogging.

As illustrated in FIG. 3, an electric component box (33) is disposed near the front panel (25a) in the casing (25). The electric component box (33) houses therein a control board (34) for the air conditioner (10).

<Air-Conditioning Control Unit>

As illustrated in FIG. 1, the indoor unit (20) has an air-conditioning control unit (35). The air-conditioning control unit (35) includes a microcomputer and a memory device which are mounted on the control board (34). The memory device stores software for operating the microcomputer. The air-conditioning control unit (35) controls constituent components of the air conditioner (10).

<General Configuration of Imaging Unit>

As illustrated in FIG. 1, the imaging unit (40) includes the camera (41) and an imaging control unit (45). The camera (41) corresponds to an imaging device of the present disclosure. The imaging unit (40) is installed in a space behind the ceiling together with the indoor unit (20).

<Camera>

The camera (41) acquires image data of the imaging target (T). The camera (41) is disposed in the casing (25). Specifically, the camera (41) is disposed in the front space (S1). The camera (41) is disposed between the inspection cover (32) and the indoor heat exchanger (22), when viewed from above. The camera (41) is supported to the back surface of the inspection cover (32) via a stay (44). As illustrated in FIG. 4, the camera (41) includes a lens (42) and a light source (43). The lens (42) is a super-wide-angle lens. The lens (42) of the camera (41) faces diagonally down so as to be directed to a bottom surface (26a) of the tray (26). Specifically, the lens of the camera (41) is directed to a recess (26b) formed in the bottom surface of the tray (26) so as to correspond to an intake portion of the pump (27).

The light source (43) illuminates an imaging target (T). Specifically, the light source (43) illuminates an imaging target (T) when the camera (41) captures an image of the imaging target (T). Thus, the camera (41) can acquire image data of the imaging target (T) at the timing when the imaging target (T) is illuminated by the light source (43). The light source (43) may be separate from the camera (41).

<Imaging Control Unit>

The imaging control unit (45) includes a microcomputer and a memory device. The memory device stores software for operating the microcomputer. The imaging control unit (45) controls the camera (41) and the light source (43). In other words, the imaging control unit (45) supplies power for operating the camera (41) and the light source (43) to the camera (41) and the light source (43). The imaging control unit (45) includes a timer (45a) and a first communication section (46).

The timer (45a) is set to the timing at which the camera (41) performs the image capturing. A setting time of the timer (45a) includes at least one of time or a time interval. In this embodiment, the timer (45a) is set to such a setting time that the camera (41) performs the image capturing at a set time (for example, around noon) once a week. The imaging timer (45a) is separate from the imaging control unit (45).

The first communication section (46) is connected to the camera (41) via a wired or wireless communication line. The first communication section (46) receives the image data acquired by the camera (41). The first communication section (46) is connected to the Internet (N) via a communication line using long term evolution (LTE). The first communication section (46) outputs the image data to the server (50) via the Internet (N). The first communication section (46) may be connected to the Internet (N) via a wireless router.

<General Configuration of Server>

The server (50) is hosted on the cloud of the Internet (N). The server (50) has a storage (52) and a second communication section (53). In this embodiment, the server (50) corresponds to an image processing device of the present disclosure.

The second communication section (53) includes a receiving section configured to receive the image data transmitted from the imaging unit (40). The second communication section (53) includes a transmitting section configured to transmit output image data to the communication terminal (60), which will be described later in detail.

The storage (52) stores the image data received in the second communication section (53). The storage (52) includes at least one of a hard disk drive (HDD), a random access memory (RAM), and a solid state drive (SSD).

<Details of Server>

The server (50) includes a microcomputer and a memory device. The memory device stores software for operating the microcomputer.

The server (50) includes, as functional elements, an estimator (54), a determiner (55), an instructor (56), and a notifier (57). In other words, the server (50) functions as the estimator (54), the determiner (55), the instructor (56), or the notifier (57) by running a program stored in the memory device.

The program stored in the server (50) corresponds to an image processing program of the present disclosure. The program causes the server (50) as a computer to perform a first process and a second process. The first process estimates a degree of fogging in the image data on the basis of the image data acquired by the camera (41) by capturing the image of the imaging target (T) inside the casing (25) of the air treatment device (10). The second process determines the output image data on the basis of the degree of fogging of the image data estimated. The output image data is image data to be output.

<Estimator>

The estimator (54) is configured to estimate the degree of fogging in the image data on the basis of the image data acquired by the camera (41). Here, the term "degree of fogging" is an indicator indicating how much the image data is fogged up due to mists inside the casing (25). A higher degree of fogging indicates that the image data is unclearer. A lower degree of fogging indicates that the image data is clearer.

The estimator (54) includes an estimation model (M), which has machine-learned to be capable of estimating the degree of fogging of the image data. The estimator (54) estimates the degree of fogging of the image data by use of the estimation model (M) machine-learned.

The estimation model (M) is configured as a multilayered neural network, which has obtained a classification function through the machine learning. The estimation model (M) of this embodiment is generated through "supervised learning". The neural network for generating the estimation model (M) learns, using training data and discriminant function. The training data is a data set of pairs of input data and teaching data corresponding thereto.

As the input data, image data of the imaging target (T) acquired by the camera (41) is used. As the teaching data, a set of labels corresponding such image data is used. The labels indicate the degree of fogging of the image data. In this embodiment, the labels are for indicating four levels of the degree of fogging (see FIG. 5).

Level 0 is a level at which there is no fogging or substantially no fogging. Level 1 is a level at which there is fogging, but the fogging is not so severe that will hinder the inspection of the imaging target (T) on the basis of the image data by an operator. Level 2 is a level at which there is fogging and the fogging is so severe that will hinder the inspection of the imaging target (T) on the basis of the image data by an operator. Level 3 is a level at which there is fogging and the fogging is so severe that the inspection of the imaging target on the basis of the image data by an operator is difficult.

The estimation model (M) is generated through such "supervised learning" of the neural network by using the training data.

The estimation model (M) may be generated by "unsupervised learning." In this case, the neural network repeats learning operations for clustering to group pieces of input data into plural classes in such a way that pieces of input data (image data) similar to each other are grouped into the same class. This allows generation of the estimation model (M) without using teaching data.

<Determiner>

The determiner (55) determines the output image data on the basis of the degree of fogging estimated by use of the estimation model (M). The output image data is the image data to be output. More specifically, the determiner (55) determines the output image data based on the degree of fogging estimated by use of the estimation model (M), and on the number of times of image capturing (n) performed by the camera (41). Here, the number of times of image capturing (n) is the number of times of image capturing (n) performed by the camera (41) to capture images of the imaging target (T) within a time period from the setting time of the timer (45a) to the determining of the output image data (this time period may be referred to as determination period hereinafter). The output image data determined by the determiner (55) is transmitted to the communication terminal (60) from the second communication section (53).

<Instructor>

The instructor (56) outputs a first instruction according to the image data estimated by use of the estimation model (M). The first instruction instructs the camera (41) to capture an image of the imaging target (T). If the degree of fogging of the image data estimated by the estimator (54) is higher than a predetermined level, the instructor (56) outputs the first instruction. If the degree of fogging of the image data estimated by the estimator (54) is higher than a predetermined level, the instructor (56) outputs the first instruction after a predetermined period (which may be referred to as a waiting time hereinafter) has elapsed.

The waiting time may be preferably 5 min or longer, but not longer than 23 hours. The waiting time is a set value that may be changed by the operator or the like as appropriate.

The first instruction is received by the first communication section (46) of the imaging unit (40) via the Internet (N).

After receiving the first instruction, the imaging control unit (45) causes the camera (41) to perform the image capturing.

<Notifier>

If the number of times of image capturing (n) performed by the camera (41) exceeds a predetermined number of times, the notifier (57) notifies of abnormality. More specifically, if the number of times of image capturing (n) performed by the camera (41) exceeds a predetermined number of times, the notifier (57) causes the second communication section (53) to transmit a signal indicative of abnormality to the communication terminal (60). The operator can be notified on the communication terminal (60) that the normal image capturing has been failed due to some abnormality.

<Communication Terminal>

The communication terminal (60) is a terminal, which the operator operates. The communication terminal (60) has a third communication section (61), a display (62), and an operation unit (63).

The third communication section (61) includes a receiving section configured to receive the output image data transmitted from the server (50). The third communication section (61) includes a transmitting section configured to transmit an instruction for instructing the server (50) to output the output image data. The third communication section (61) includes the receiving section configured to receive an abnormal signal transmitted from the server (50).

The display (62) is configured as, for example, a liquid crystal monitor. The display (62) displays thereon the image data of the imaging target (T). More specifically, the image data outputted from the server (50) is displayed on the display (62).

The operation unit (63) is a keyboard, a touch panel, or the like. Using the operation unit (63), the operator operates application software stored in the communication terminal (60). Through the operation of the application software, the transmitting the instruction instructing the server (50) to output the output image data, and the displaying the image data on the display (62) can be performed.

The communication terminal (60) notifies the operator of the occurrence of abnormality on the basis of the abnormal signal transmitted from the server (50). More specifically, the communication terminal (60) notifies the operator of the occurrence of abnormality by displaying on the display (62) a sign indicative of occurrence of abnormality, or by emitting sound or light indicative of occurrence of abnormality.

—Operation—

An operation of the air conditioner (10) according to the first embodiment will be described. The air conditioner (10) performs a cooling operation and a heating operation.

<Cooling Operation>

In the cooling operation, the four-way switching valve (14) is in the first state. The refrigerant compressed in the compressor (12) releases heat (condenses) in the outdoor heat exchanger (13) and is decompressed by the indoor expansion valve (21). The decompressed refrigerant evaporates in the indoor heat exchanger (22) and is compressed again in the compressor (12).

When the indoor fan (23) is operated, room air (RA) is sucked into the air flow path (30) through the intake port (28). The air in the air flow path (30) passes through the indoor heat exchanger (22). In the indoor heat exchanger (22), the air is cooled by the evaporating refrigerant. The cooled air passes through the blow-out port (29), and is then supplied as supply air (SA) to the indoor space.

If the air is cooled to a temperature equal to or lower than the dew point in the indoor heat exchanger (22), moisture in the air condenses. The tray (26) receives this condensed water. The condensed water received by the tray (26) is discharged to the outside of the casing (25) by the pump (27).

In the cooling operation, the air-conditioning control unit (35) controls the evaporation temperature of the indoor heat exchanger (22) so that the indoor temperature approaches a target temperature. The indoor temperature is detected by a temperature sensor provided, for example, at the intake port (28). The target temperature is determined based on a set temperature set by a user, for example, with remote control. The evaporation temperature is worked out from values detected by the refrigerant temperature sensor and the refrigerant pressure sensor.

<Heating Operation>

In the heating operation, the four-way switching valve (14) is in the second state. The refrigerant compressed in the compressor (12) releases heat (condenses) in the indoor heat exchanger (22) and is decompressed by the outdoor expansion valve (15). The decompressed refrigerant evaporates in the outdoor heat exchanger (13) and is compressed again in the compressor (12).

When the indoor fan (23) is operated, room air (RA) is sucked into the air flow path (30) through the intake port (28). The air in the air flow path (30) passes through the indoor heat exchanger (22). In the indoor heat exchanger (22), the air is heated by the refrigerant releasing heat. The heated air is then supplied to the indoor space as supply air (SA) through the blow-out port (29).

In the heating operation, the air-conditioning control unit (35) controls the condensation temperature of the indoor heat exchanger (22) so that the indoor temperature approaches a target temperature. The condensation temperature is obtained from values detected by the refrigerant temperature sensor and the refrigerant pressure sensor.

<Generation of Mists in Casing>

Mists would generate inside the casing (25) depending on the state of the indoor unit (20). Conditions where mists are generated will be illustrated below.

1) The air inside the casing (25) is cooled to the dew point or below by the indoor heat exchanger (22). In this case, moisture in the air condenses, and mists are generated in the casing (25).

Specific examples where Condition 1) is met include:
1a) immediately after the end of a cooling operation; 1b) immediately after the start of a cooling operation; 1c) when the user suddenly drops the set temperature for a cooling operation; 1d) when an oil return operation is performed; and 1e) when a reverse cycle defrosting operation is performed.

Regarding 1a), the indoor fan (23) stops when the cooling operation ends. If air in the indoor space is taken into the casing (25) in this state, the air would be cooled to a temperature equal to or lower than the dew point by the indoor heat exchanger (22) serving as an evaporator. The air tends to be cooled to a temperature equal to or lower than the dew point by the indoor heat exchanger (22) particularly when a pump-down operation is performed at the end of the cooling operation. The pump-down operation used herein refers to an operation in which the compressor (12) is driven for a predetermined period in order to draw out the refrigerant accumulated in the indoor heat exchanger (22). The pressure of the refrigerant in the indoor heat exchanger (22) drops steeply with the pump-down operation. When the temperature in the indoor heat exchanger (22) drops with this pressure drop of the refrigerant, the air in the casing (25) tends to be cooled to a temperature equal to or lower than the dew point.

Regarding 1b), the temperature of the indoor heat exchanger (22) serving as an evaporator drops steeply, immediately after the start of the cooling operation. Thus, the air tends to be cooled to a temperature equal to or lower than the dew point.

Regarding 1c), the evaporation temperature of the indoor heat exchanger (22) drops abruptly when the user lowers the set temperature abruptly. Thus, the air tends to be cooled to a temperature equal to or lower than the dew point.

Regarding 1d), the oil return operation refers to an operation of increasing the number of rotations of the compressor (12) to return oil accumulated in the indoor heat exchanger (22) to the compressor (12). The evaporation temperature of the indoor heat exchanger (22) is lowered if the number of rotations of the compressor (12) is increased. Thus, the air tends to be cooled to a temperature equal to or lower than the dew point.

Regarding 1e), the reverse cycle defrosting operation is performed during a heating operation in winter, for example. The reverse cycle defrosting operation refers to an operation for defrosting the outdoor heat exchanger (13). In the reverse cycle defrosting operation, similarly to the cooling operation, a refrigeration cycle is performed in which the refrigerant compressed in the compressor (12) releases heat and condenses in the outdoor heat exchanger (13) and evaporates in the indoor heat exchanger (22). When the indoor heat exchanger (22) serving as a condenser in the heating operation turns to function as an evaporator in the reverse cycle defrosting operation, the air tends to be cooled to a temperature equal to or lower than the dew point.

2) When relatively low temperature air in the casing (25) is mixed with relatively high temperature air entering the casing (25) from the indoor space. In this case, the air that has entered the casing (25) from the indoor space is cooled to a temperature equal to or lower than the dew point by the low temperature air, thereby generating mists. The air in the casing (25) is cooled in the indoor heat exchanger (22) and is also cooled by low temperature water accumulated in the tray (26), causing a drop of the temperature of the air in the casing (25).

Further, if the above-mentioned conditions 1a), 1b), 1c), 1d), and 1e) are met, the temperature of the indoor heat exchanger (22) and/or the temperature of the water accumulated in the tray (26) drop. As a result, the temperature of air in the casing (25) easily drops.

3) When relatively high temperature air in the casing (25) is cooled by relatively low temperature air in the indoor space to a temperature equal to or lower than the dew point. In this case, moisture in the air condenses, and mists are generated in the casing (25). During a heating operation or after the end of the heating operation, for example, the temperature of air in the casing (25) is relatively high. The condition 3) is met in this state if relatively low temperature air enters the indoor space and subsequently the relatively low temperature air is taken into the casing (25). If the indoor unit (20) is installed at a lower portion of the indoor space (e.g., floor standing type), cold air tends to come into the casing due to convection of heat.

<Operations of Imaging Unit, Server, and Communication Terminal>

The image data captured by the camera (41) may be fogged due to mists generated in the casing (25) as described above. In the first embodiment, in particular, the camera (41) and the imaging target (T) are disposed in the front space (S1) that is separated from the air flow path (30). Mists tend to remain in the front space (S1) since not as much air as in the air flow path (30) flows in the front space (S1).

The operator cannot inspect the imaging target (T) well if the image data is unclear due to the generation of mists. Therefore, the air treatment system (1) is configured to perform the following operation in order to reduce cases that the image data acquired is unclear.

<Operation of Imaging Unit>

Figure 6:
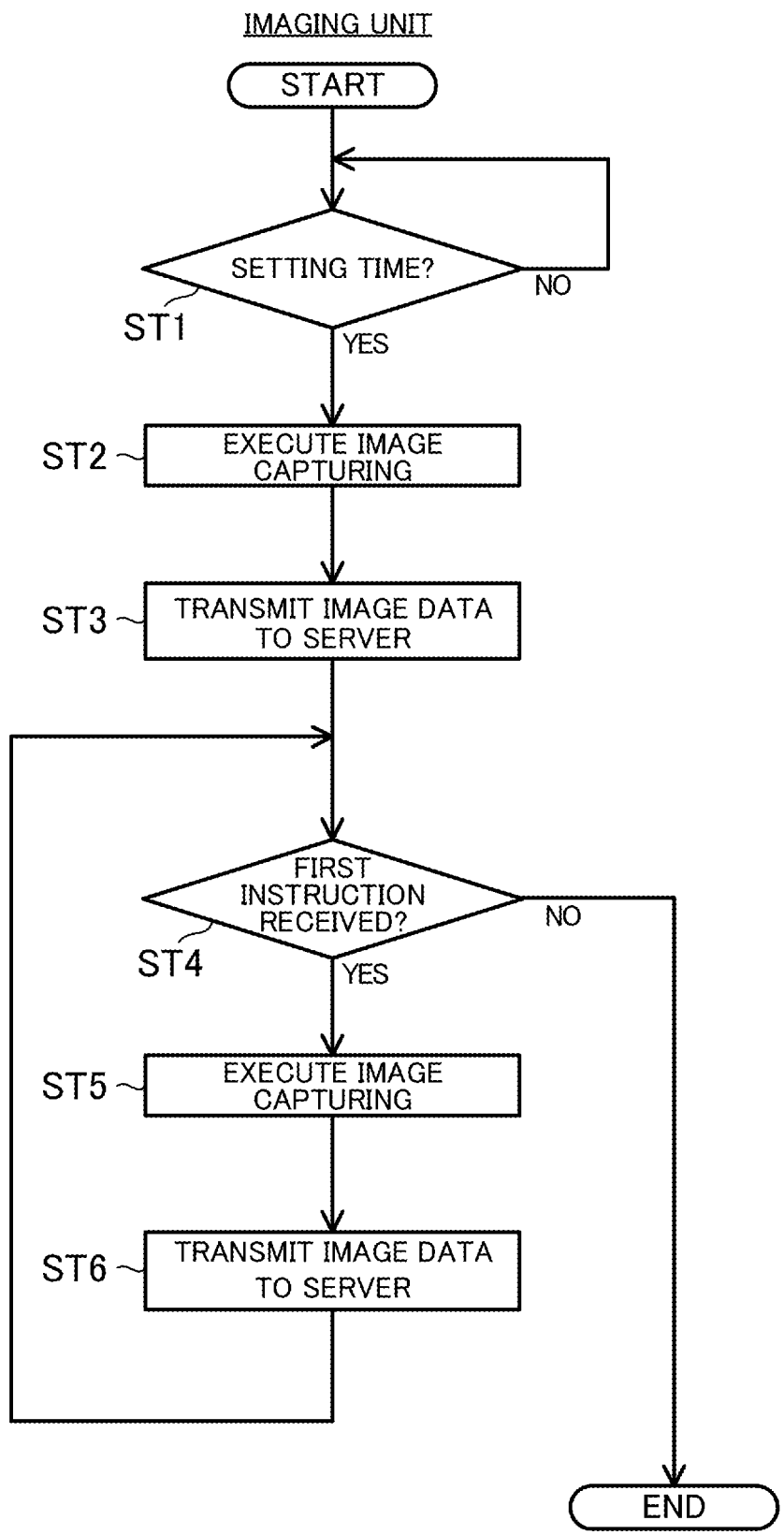
FIG. 6 is a flowchart showing operations of an imaging unit.

As illustrated in FIG. 6, if the setting time set in the timer (45a) of the imaging unit (40) reaches (YES at Step ST1), the imaging control unit (45) causes the camera (41) and the light source (43) to operate. As a result, the camera (41) captures an image of an imaging target (T), thereby acquiring image data of the imaging target (T) (Step ST2). Next, the first communication section (46) of the imaging unit (40) transmits to the server (50) the image data acquired (Step ST3). The image data is received by the second communication section (53) of the server (50) via the Internet.

After that, if the imaging unit (40) receives a first instruction (which will be described in detail later) transmitted from the server (50) (YES at Step ST4), the camera (41) of the imaging unit (40) captures an image of the imaging target (T) again (Step ST5). Again, the first communication section (46) of the imaging unit (40) transmits to the server (50) the image data acquired (Step ST6).

<Basic Operation of Server>

Figure 7:
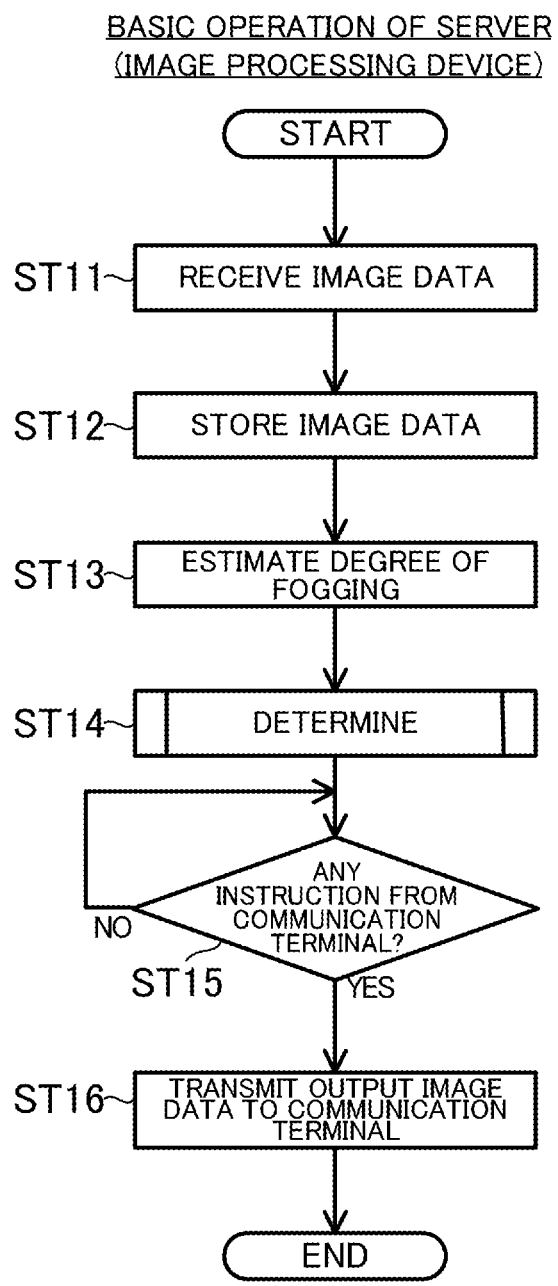
FIG. 7 is a flowchart showing basic operations of an image processor.

As illustrated in FIG. 7, the server (50) receives the image data transmitted from the imaging unit (40) (Step ST11). Then, the server (50) stores the received image data in the storage (52) (Step ST12).

Then, the estimator (54) estimates the degree of fogging of the image data stored in the storage (52) (Step ST13) More specifically, the estimator (54) estimates the degree of fogging of the image data by use of the estimation model (M) generated by the machine learning. The estimation model (M) determines the level of the degree of fogging of the image data from among levels 0 to 3 listed in FIG. 5. The estimator (54) associates the level of the degree of fogging of the image data estimated by use of the estimation model (M) with the image data in question.

Next, in a determining process of performing the determining process (Step ST14), which will be described in detail later, the server (50) determines the output image data on the basis of the degree of fogging of the image data.

After that, when the server (50) receives a command from the communication terminal (60) (YES in Step ST15), the output image data is transmitted to the communication terminal (60) (Step ST16). The output image data is received by the communication terminal (60). The operator checks the output image data on the display (62). Thus, the operator can inspect the imaging target (T) via the communication terminal (60).

<Determining Process>

Figure 8:
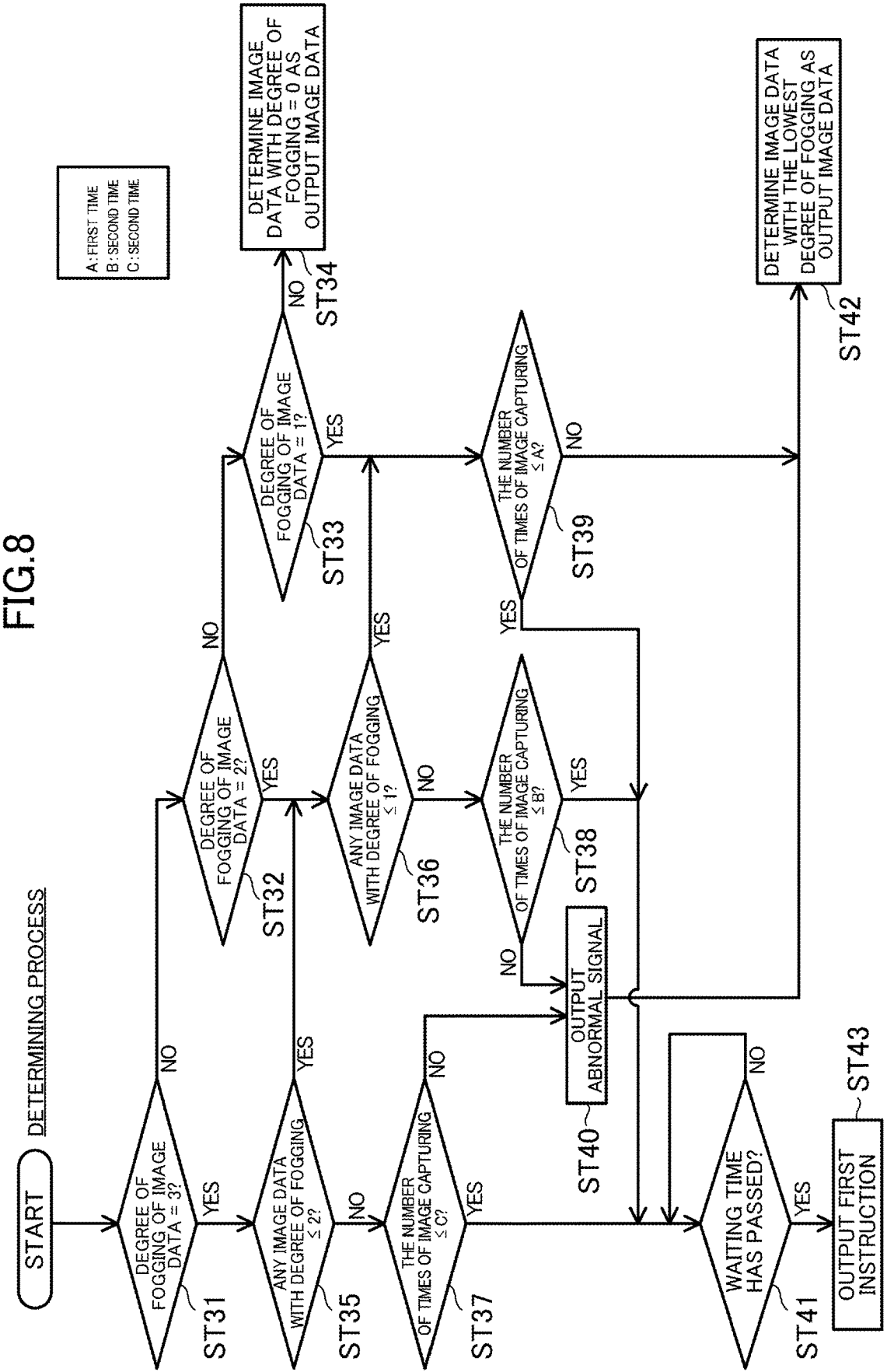
FIG. 8 is a flowchart of a determining process.

The determining process at Step ST14 in FIG. 7 will be described herein in detail, referring to FIG. 8. The determining process determines the output image data from one or more pieces of image data acquired within the determination period.

In the following, the determining process is described as to how the determine process is performed in each case of the levels of the degree of fogging of the image data. In the following description, image data of an image captured at the setting time of the timer (45a) will be referred to as "image data 1," image data of an image captured at a first time after the setting time as instructed by the first instruction will be referred to as "image data 2," and image data of an image captured at a second time after the setting time as instructed by the first instruction will be referred to as "image data 3." In the following description, the "level of the degree of fogging" will be simply referred to as "degree of fogging."

(1) The Degree of Fogging of the Image Data 1 is Level 0.

In the case where the degree of fogging of the image data 1 is level 1, neither the condition of Step ST31 (the degree of fogging of image data is level 3), the condition of Step ST32 (the degree of fogging of image data is level 2), nor the condition of Step ST33 (the degree of fogging of image data is level 1) is met. In this case, in Step ST34, the determiner (55) determines, as the output image data, the image data 1 whose degree of fogging is level 0. The image data 1 whose degree of fogging is level 0 has no fogging or substantially no fogging. Therefore, the operator can sufficiently inspect the imaging target (T) on the basis of the image data 1.

(2) The Degree of Fogging of the Image Data 1 is Level 1.

In the case where degree of fogging of the image data 1 is level 1, the conditions of Step ST31 and Step ST32 are not met, but the condition of Step ST33 is met. In this case, the process proceeds to Step ST39. Because the number of times of image capturing (n=1) is equal to a predetermined value A (=1), the condition of Step ST39 is met. After the predetermined waiting time has elapsed (YES at Step ST41), the instructor (56) outputs the first instruction (Step ST43). After the imaging unit (40) receives the first instruction (YES at Step ST4 in FIG. 6), the camera (41) captures an image of imaging target (T) (Step ST5). Next, the imaging unit (40) transmits the image data 2 to the server (50) (Step ST6).

The server (50) stores the received image data 2 in the storage (52) (Step ST11 and Step ST12 in FIG. 7) and, after that, estimates the degree of fogging of the image data 2 (Step ST13). Next, the determining process is performed (Step ST14). The following will describe further branched processes performed thereafter in the case where the degree of fogging of the image data is level 1.

(2-1) The Degree of Fogging of the Image Data 2 is Level 0.

In the case where the degree of fogging of the image data 2 is level 0 after the process described in (2) above, the process goes through Step ST31, Step ST32, and Step ST33, and proceeds to Step ST34. At Step ST34, the determiner (55) determines, as the output image data, the image data 2 whose degree of fogging is level 0.

(2-2) The Degree of Fogging of the Image Data 2 is Level 1.

In the case where the degree of fogging of the image data 2 is level 1 after the process described in (2) above, the number of times of image capturing (n=2) is greater than the predetermined value A (=1) at Step ST39. Thus, the condition of Step ST39 is not met, and accordingly the process proceeds to Step ST42. At Step ST42, the determiner (55) determines, as the output image data, a piece of image data with the lowest degree of fogging from among the pieces of image data acquired within the determination period. In this example, the degree of fogging of the image data 1 is level 1 and the degree of fogging of the image data 2 is level 1, and therefore the image data 1 and/or the image data 2 is determined as the output image data. The degree of fogging 1 is the level in which there is fogging, but the fogging is not so severe that the fogging will hinder the inspection. Thus, the operator can inspect the imaging target (T) on the basis of the image data 1.

(2-3) The Degree of Fogging of the Image Data 2 is Level 2.

If the degree of fogging of the image data 2 is level 2 after the process described in (2) above, the condition of Step ST32 is met and the process proceeds to Step ST36. At Step ST36, the determiner (55) determines whether there is a piece of image data whose degree of fogging is 1 or lower from among one or more pieces of image data acquired after the setting time. In this example, the degree of fogging of the image data 1 is level 1 and the degree of fogging of the image data 2 is level 2, and therefore the condition of Step ST36 is met. Next, the process goes through Step ST39 and proceeds to Step ST42. At Step ST42, the determiner (55) determines, as the output image data, the image data 1 which is the piece of image data with the lowest degree of fogging.

(2-4) The Degree of Fogging of the Image Data 2 is Level 3.

If the degree of fogging of the image data 2 is level 3 after the process described in (2) above, the condition of Step ST31 is met and the process proceeds to Step ST35. At Step ST35, the determiner (55) determines whether there is a piece of image data whose degree of fogging is 2 or lower from among one or more pieces of image data acquired after the setting time. In this example, the degree of fogging of the image data 1 is level 1 and the degree of fogging of the image data 2 is level 3, and therefore the condition of Step ST35 is met. Next, the process goes through Step ST36 and Step ST39, and proceeds to Step ST42. At Step ST42, the determiner (55) determines, as the output image data, the piece of image data with the lowest degree of fogging.

(3) The Degree of Fogging of the Image Data 1 is Level 2.

In the case where the degree of fogging of the image data 1 is level 2, the process goes through Step ST31 and Step ST32, and proceeds to Step ST36. In this example, the condition of Step ST36 is not met, and therefore the process proceeds to Step ST38. Because the number of times of image capturing (n=1) is lower than a predetermined value B (=2), the process proceeds to Step ST41. After the predetermined waiting time has elapsed (YES at Step ST41), the instructor (56) outputs the first instruction (Step ST43). As a result, the camera (41) acquires image data of the imaging target (T) again, and the estimator (54) estimates the degree of fogging of the image data. The following will describe further branched processes performed thereafter in the case where the degree of fogging of the image data is level 2.

(3-1) The Degree of Fogging of the Image Data 2 is Level 0.

If the degree of fogging of the image data 2 is level 0 after the process described in (3) above, a process similar to that described in (2-1) above is performed. At Step ST34, the determiner (55) determines, as the output image data, the image data whose degree of fogging is level 0.

(3-2) The Degree of Fogging of the Image Data 2 is Level 1.

If the degree of fogging of the image data 2 is level 1 after the process described in (3) above, a process similar to that described in (2-2) above is performed. At Step ST42, the determiner (55) determines, as the output image data, the piece of image data with the lowest degree of fogging.

(3-3) The Degree of Fogging of the Image Data 2 is Level 2.

If the degree of fogging of the image data 2 is level 2 after the process described in (3) above, the process goes through Step ST31, Step ST32, and Step ST36, and proceeds to Step T38. Because the number of times of image capturing (n=2) is equal to the predetermined value B (=2), the condition of Step ST38 is met and the process proceeds to the Step ST41. After the predetermined waiting time has elapsed (YES at Step ST41), the instructor (56) outputs the first instruction (Step ST43). The following will describe further branched processes performed thereafter in the case where the degree of fogging of the image data is level 1.

(3-3-1) If the degree of fogging of the image data 3 is 0 after the process described in (3-3) above, the process proceeds to Step ST34. The determiner (55) determines, as the output image data, the image data to be utilized for the inspection.

(3-3-2) If the degree of fogging of the image data 3 is level 1 after the process described in (3-3) above, the process proceeds to Step ST42. The determiner (55) determines, as the output image data, the piece of image data with the lowest degree of fogging.

(3-3-3) If the degree of fogging of the image data 3 is level 2 after the process described in (3-3) above, the number of times of image capturing (n=3) is greater than the predetermined value B (=2) at Step ST38. Thus, the condition of Step ST38 is not met, and therefore the process proceeds to Step ST40. At Step ST40, the notifier (57) causes the second communication section (53) to output the abnormal signal.

As such, in this example, if the number of times of image capturing (n) exceeds the predetermined number of times (3 times) and the degree of fogging of the image data is not equal to or lower than the second lowest predetermined level (level 1), the notifier (57) causes the output of the signal for notifying of the occurrence of abnormality. This allows the operator to know, based on the abnormal signal received by the communication terminal (60), that normal image capturing has been failed due to some abnormality.

After the output of the abnormal signal at Step ST41, the process proceeds to the Step ST42. At Step ST42, the determiner (55) determines, as the output image data, the piece of image data with the lowest degree of fogging.

(3-3-4) If the degree of fogging of the image data 3 is level 3 after the process described in (3-3) above, the process goes through Step ST31 and Step ST35, and proceeds to Step ST37. Because the number of times of image capturing (n=3) is greater than a predetermined value C (=2), the condition of Step ST37 is not met, and, therefore, the process proceeds to Step ST40. The process thereafter is the same as the one described in (3-3-3) above.

(3-4) The Degree of Fogging of the Image Data 2 is Level 3.

If the degree of fogging of the image data 2 is level 3 after the process described in (3) above, the process goes through Step ST31 and Step ST35, and proceeds to Step ST37. Because the number of times of image capturing (n=2) is equal to the predetermined value C (=2), the condition of Step ST37 is met. After the predetermined waiting time has elapsed (YES at Step ST41), the instructor (56) outputs the first instruction (Step ST43). The explanation of the process thereafter is not repeated here.

(4) The Degree of Fogging of the Image Data 1 is Level 3.

If the degree of fogging of the image data 1 is level 3, the process goes through Step ST31 and Step ST35, and proceeds to Step ST37. Because the number of times of image capturing (n=1) is lower than the predetermined value C (=2), the condition of Step ST37 is met. After the predetermined waiting time has elapsed (YES at Step ST41), the instructor (56) outputs the first instruction (Step ST43). The explanation of the process thereafter is not repeated here.

The predetermined values A, B, and C are not limited to the values described above, and may be set arbitrarily as long as A≤B≤C. The number of times of image capturing performed by the imaging device (41) is changed according to the predetermined values A, B, and C, and this change changes the number of times the communication of the image data is performed. Therefore, the predetermined values may be determined as appropriate, taking communication cost of the image data into consideration.

<Program>

The program installed on the server (50), which is a computer, causes the server (50) to execute Step ST11 to Step ST16 illustrated in FIG. 7. In this way, an image processing device and an image processing method of the present disclosure can be realized.

Effect of First Embodiment

The determiner (55) determines the output image data on the basis of the degree of fogging estimated by the estimator (54). This configuration allows to reduce such cases that unclear image data, which has been caused due to mists in the casing (25), is output as the output image data. As a result, it becomes possible to reduce such cases that such unclear image data is output to the communication terminal (60), thereby reducing such cases that the operator cannot inspect the imaging target (T). This can reduce such cases that the transmission of such unclear image data adds to the volume of the communication data.

The determiner (55) determines, as the output image data, the image data whose degree of fogging is equal to or less than a predetermined level (which is level 1 in this example). This makes it possible to selectively output relatively clear image data as the output image data.

The degree of fogging is three- or more-leveled, and the determiner (55) determines, as the output image data, a piece of image data with the lowest degree of fogging (the degree of fogging is level 0) from among the three- or more leveled degree of fogging. This makes it possible to selectively output, as the output image data, the clearest piece of the image data from among the pieces of image data acquired by the camera (41).

If the degree of fogging of the image data is higher than a predetermined level, the instructor (56) outputs the first instruction instructing the camera (41) to take an image of the imaging target (T). This makes it possible that the image data of the imaging target (T) can be reacquired if the pieces of image data having been acquired are all unclear.

If the degree of fogging of the image data is higher than the predetermined level, the instructor (56) outputs the first instruction after the predetermined waiting time has elapsed. It can be expected that mists inside the casing (25) will reduce over time. Thus, the configuration in which the camera (41) is caused to capture an image of the imaging target (T) after the predetermined waiting time has elapsed allows acquisition of image data with a low degree of fogging.

If the waiting time is too short, there is a possibility that the reduction of the mists inside the casing (25) would not occur. With the waiting time of 5 min or longer, it is possible to acquire image data of the imaging target (T) captured when the mists reduce. If the waiting time is too long, updating intervals of the output image data would be long. With the waiting time of 23 hours, the updating intervals of the output image data can be shortened.

When the waiting time is 24 hours, this would possibly cause the following defects. Taking this into consideration, the waiting time is 23 hours.

As described above, the mists are influenced by the operation states of the air conditioner (10). For example, assume that the air conditioner (10) is under such timer control that the air conditioner (10) starts the cooling operation at a predetermined time (9:00 AM) every day. In this case, if the first acquisition of the image data is set to some time past 9:00 AM, the image capturing by the camera (41) is carried out right after the start of the cooling operation. As described above, the mists are likely to be generated inside the casing (25) right after the start of the cooling operation. Therefore, if the acquisition of the image data is carried out at this time, the image data acquired is high in degree of fogging, which leads to the output of the first instruction and the redoing of the image capturing by the camera (41). In this case, if the waiting time is 24 hours, the next image capturing by the camera (41) will be carried out at the some time past 9:00 AM the next day. As a result, the redoing of the image capturing by the camera (41) is carried out right after the start of the cooling operation. Therefore, the image data would be possibly acquired under the mists inside the casing (25) as in the day before.

On the contrary, if the waiting time is 23 hours, the image capturing of the camera (41) will be performed at 8:00 AM. At this time, the cooling operation of the air conditioner (10) have not been carried out yet, so that it is expected that the image data can be acquired without the mists.

The determiner (55) determines the output image data on the basis of each degree of fogging of a plurality pieces of image data stored in the storage (52). With this configuration, it is possible to determine, as the output image data, the piece of the image data with the lowest degree of fogging from among the plurality of pieces of image data.

The determiner (55) determines the output image data on the basis of the number of times of image capturing (n) performed by the camera (41) and each degree of fogging of the plurality of pieces of image data. The configuration in which the number of times of image capturing (n) is taken into consideration makes it possible to reduce such cases that the number of times of image capturing (n) is excessively increased, adding to the volume of communication data.

If the number of times of image capturing (n) is 2 times or more, and the plurality of pieces of image data includes a piece of image data with the second lowest degree of fogging (i.e., image data whose degree of fogging is level 1), the determiner (55) determines, as the output image data, the image data with the second lowest degree of fogging. This makes it possible to determine, as the output image data, a relatively clear piece of image data, while reducing such cases that the number of times of image capturing (n) is excessively increased.

The notifier (57) is configured to output a signal for notifying of abnormality, if the number of times of image capturing (n) performed by the camera (41) exceeds a predetermined number of times. If the number of times of image capturing (n) exceeds such a predetermined number of times, there is a high possibility that normal image capturing has been failed due to some abnormality. Examples of such abnormality includes (1) the normal acquisition of the image data cannot be performed due to erroneous posture of the camera (41) such as being installed at a wrong angle, (2) the air conditioner (10) is installed in such a poor environment in which intake air contains a great amount of moisture. With the configuration in which the notifier (57) notifies of abnormality, the operator can be promptly notified of such abnormality.

If the number of times of image capturing (n) performed by the camera (41) exceeds such a predetermined number of times, the instructor (56) does not output the first instruction. This configuration makes it possible to avoid wastefully acquiring the image data under the situation with some abnormality.

The estimator (54) includes an estimation model (M) for estimating the degree of fogging of the image data through the machine learning. This allows to establish highly accurate estimation of the degree of fogging that would be caused due to fogging inside the casing (25).

Second Embodiment

An air conditioner (10) of a second embodiment has an indoor unit (20) configured to treat outdoor air. The indoor unit (20) takes outdoor air (OA) in and adjusts the temperature and humidity of the air taken in. The air whose temperature and humidity have been adjusted is supplied to the indoor space as supply air (SA). The indoor unit (20) takes room air (RA) in and discharges the air taken in to the outdoor space.

Figure 9:
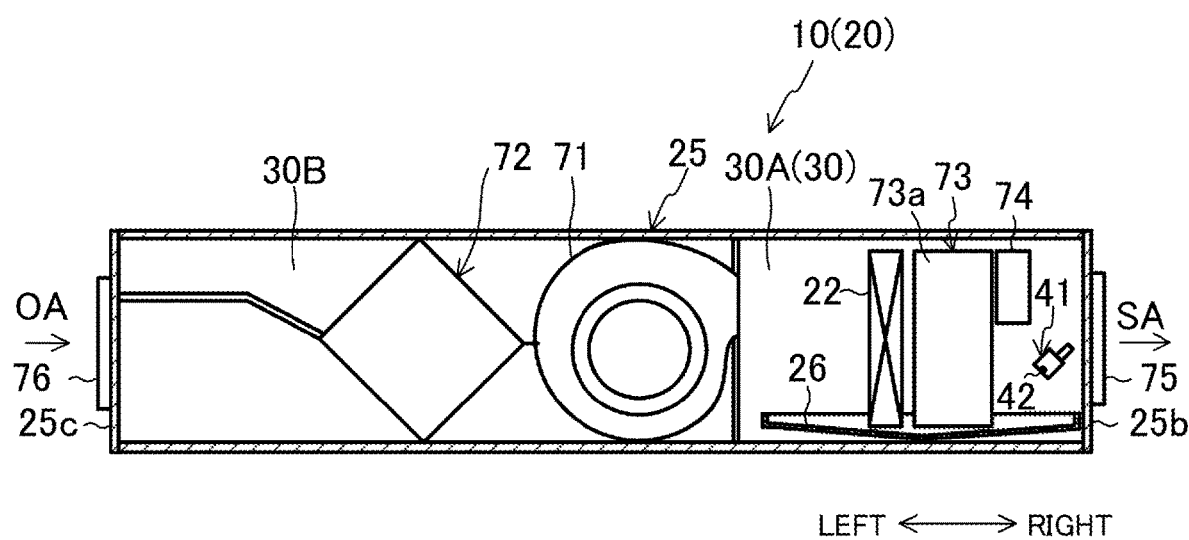
FIG. 9 is a diagram illustrating the inside of the indoor unit according to a second embodiment, as viewed from the front.

The indoor unit (20) illustrated in FIG. 9 is installed in a space behind the ceiling. The indoor unit (20) includes a casing (25), an air supply fan (71), an exhaust fan (not shown), an indoor heat exchanger (22), a total heat exchanger (72), a humidifier (73), a tank (74), and a tray (26).

The casing (25) has a shape of a rectangular parallelepiped hollow box. The casing (25) has a right-side panel (25*b*), where an air supply port (75) and an indoor air port (not shown) are provided. The casing (25) has a left-side panel (25*c*), where an outside air port (76) and an exhaust port (not shown) are provided. An air supply passage (30A), which is an air flow path, is provided in the casing (25). The air supply passage (30A) extends from the outside air port (76) to the air supply port (75). An exhaust passage (30B) is provided in the casing (25). The exhaust passage (30B) extends from the indoor air port to the exhaust port.

The air supply fan (71) transfers air in the air supply passage (30A). The air supply fan (71) corresponds to the fan of the present disclosure. The exhaust fan transfers air in the exhaust passage (30B).

The indoor heat exchanger (22) is disposed in the air supply passage (30A). The indoor heat exchanger (22) is connected to a refrigerant circuit (R) similar to the refrigerant circuit (R) of the first embodiment. The indoor heat exchanger (22) is an air heat exchanger that allows heat exchange between the air and the refrigerant. The indoor heat exchanger (22) serves as an evaporator in a cooling operation and as a condenser (radiator) in a heating operation.

The total heat exchanger (72) allows heat exchange between the sensible heat and latent heat of air flowing in the air supply passage (30A) and the sensible heat and latent heat of air flowing in the exhaust passage (30B).

The humidifier (73) is disposed in the air supply passage (30A). The humidifier (73) has a humidifying element (73*a*) as a hygroscopic member. Water is supplied to the humidifying element (73*a*) from the tank (74). Moisture of the humidifying element (73*a*) is given to air while the air passes through the humidifier (73).

In the second embodiment, the camera (41) of the imaging unit (40) is disposed in the air supply passage (30A). The lens (42) of the camera (41) is directed to the humidifying element (73*a*) and the tray (26). The imaging target (T) of the camera (41) includes the humidifying element (73*a*) and the tray (26). The image data captured by the camera (41) is output to a communication terminal (60) via a server (50).

Mists would be generated in the casing (25) in the second embodiment as well. An air treatment system (1) of the second embodiment includes the imaging unit (40) and a server (50), which are similar to those in the first embodiment. An estimator (54) of the server (50) estimates the degree of fogging of image data. The determiner (55) determines output image data on the basis of the degree of fogging of the image data. Thus, the second embodiment also can reduce such cases that unclear image data is output.

Third Embodiment

An air conditioner (10) according to a third embodiment includes a ceiling hanging-type or ceiling embedded-type indoor unit (20).

Figure 10:
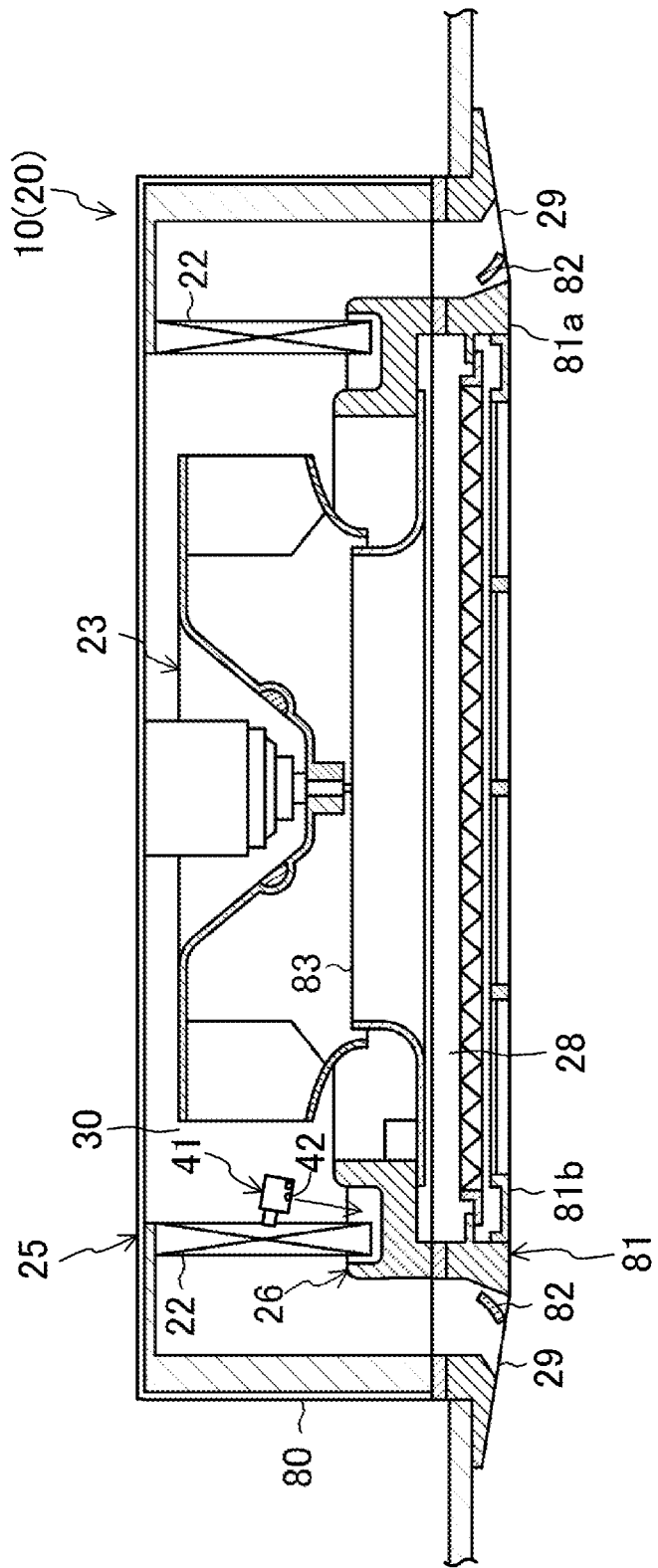
FIG. 10 is a diagram illustrating a vertical cross-sectional view of an internal structure of an indoor unit according to a third embodiment.

As illustrated in FIG. 10, the indoor unit (20) includes a casing (25) installed in a ceiling cavity. The casing (25) includes a casing body (80) and a panel (81). The casing body (80) has a rectangular parallelepiped box-like shape with its lower side open. The panel (81) is removably attached to an opening side of the casing body (80). The panel (81) includes a rectangular frame-shaped panel body (81*a*) and an intake grille (81*b*) provided at the center of the panel body (81*a*).

One intake port (28) is formed in the center of the panel body (81*a*). The intake grille (81*b*) is attached to the intake port (28). Four side edge portions of the panel body (81*a*) each have a blow-out port (29). The blow-out ports (29) extend along the respective four side edges. A flap (82) is provided in each of the blow-out ports (29). An air flow path (30) is provided in the casing (25), the air flow path (30) extending from the intake port (28) to the blow-out port (29).

A bell mouth (83), an indoor fan (23), an indoor heat exchanger (22), and a tray (26) are provided in the casing body (80). The bell mouth (83) and the indoor fan (23) are disposed above the intake grille (81*b*). The indoor heat exchanger (22) is disposed in the air flow path (30) so as to surround the indoor fan (23). The indoor heat exchanger (22) is a fin-and-tube heat exchanger. The tray (26) is disposed below the indoor heat exchanger (22) in the air flow path (30).

The camera (41) of the third embodiment is disposed in the air flow path (30). The lens (42) of the camera (41) is directed to the bottom of the tray (26). The imaging target (T) is the tray (26).

Mists would be generated in the casing (25) in the third embodiment as well. An air treatment system (1) of the third embodiment includes the imaging unit (40) and a server (50), which are similar to those in the first embodiment. An estimator (54) of the server (50) estimates the degree of fogging of image data. The determiner (55) determines output image data on the basis of the degree of fogging of the image data. Thus, the third embodiment also can reduce such cases that unclear image data is output.

Variations of Embodiments

The foregoing embodiments may be modified as follows. Computer-installable Programs according to these variations described below are configured to cause a computer to execute the processes of the estimator (54) and the determiner (55) according to the variation. This allows to realize an image processing device and an image processing method of the present disclosure.

<First Variation>

An instructor (56) of a server (50) is different from that in the first embodiment. The instructor (56) of the first variation is configured such that, if the degree of fogging of the image data estimated in the estimator (54) is higher than a predetermined level, the instructor (56) outputs a second instruction before outputting the first instruction. The second instruction is an instruction for instructing the air treatment device (10) to activate the fan (23, 71) or to operate the fan (23, 71) at a greater air rate.

In the first variation, the server (50) and the air-conditioning control unit (35) can communicate with each other.

Figure 11:
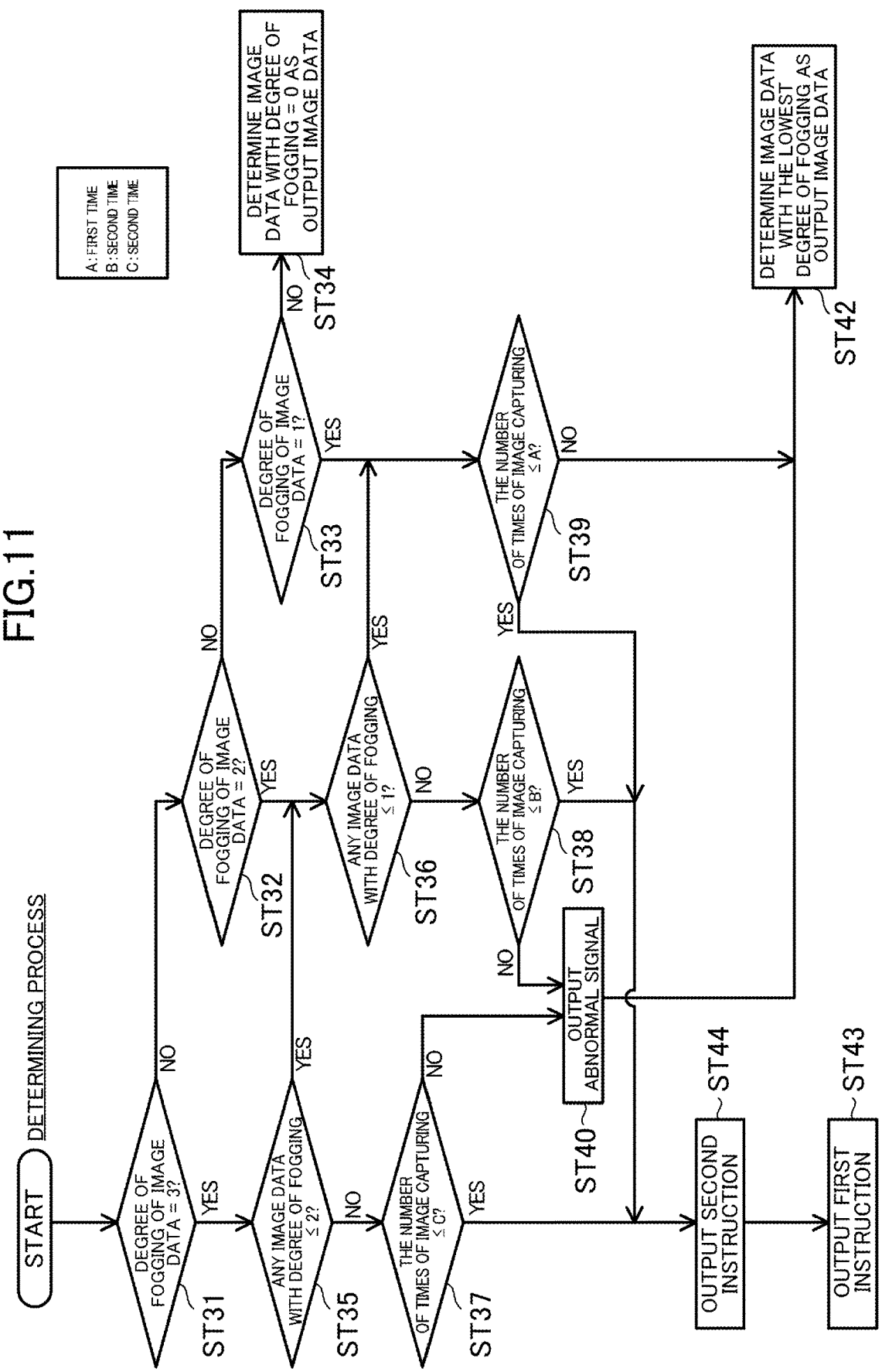
FIG. 11 is a view of a first variation, being equivalent to FIG. 8.

As illustrated in FIG. 11, if any of Step ST37, Step ST38, and Step ST39 is met, the process proceeds to Step ST44. At Step ST44, the instructor (56) outputs the second instruction. The second instruction is transmitted from the server (50) to the air-conditioning control unit (35) via the Internet (N). The second instruction may be transmitted to the air-conditioning control unit (35) via the imaging unit (40).

The air-conditioning control unit (35), which has received the second instruction, controls the fan (23, 71). More specifically, if the fan (23, 71) is not in action, the air-conditioning control unit (35) activates the fan (23, 71). If the fan (23, 71) is in action, the air-conditioning control unit (35) increases the number of rotations of the fan (23, 71). These controls increase the air flow through the air flow path (30) in the casing (25), thereby facilitating a prompt discharge of the fogging inside the casing (25) to the outside. The fan herein corresponds to the indoor fan (23) in the first and third embodiments. The fan herein corresponds to the air supply fan (71) in the second embodiment.

The instructor (56) outputs the first instruction after the output of the second instruction. The imaging unit (40), which has received the first instruction, causes the camera (41) to capture an image of the imaging target (T) thereby to acquire the image data, as described above. At this timing, the increase of the airflow caused by the fan (23, 71) has thinned the fogging around the imaging target (T). This can lower the degree of fogging of the image data to be transmitted to the server (50) next.

In order to sufficiently attain the advantageous effect brought by the control of fan (23, 71), it is preferable that the imaging target (T) be in the air flow path (30). In addition, it is preferable that the imaging device (41) be disposed in the air flow path (30).

<Second Variation>

In the foregoing embodiments, the server (50) corresponds to the image processing device of the present disclosure. However, in a second variation illustrated in FIG. 12, an imaging control unit (45) corresponds to the image processing device of the present disclosure. An air treatment system (1) of the second variation includes air conditioner (10) and an imaging unit (40). The imaging control unit (45) of the imaging unit (40) includes, as functional elements, an estimator (54), a determiner (55), an instructor (56), and a notifier (57), which are similar to those in the foregoing embodiments. The imaging control unit (45) includes a storage (52) for storing therein the image data acquired by the camera (41).

The storage (52) includes at least one of a secure digital (SD) memory card, a universal serial bus (USB) flash memory, a hard disk drive (HDD), a random access memory (RAM), and a solid state drive (SSD).

The imaging control unit (45) is configured such that the estimator (54) estimates the degree of fogging of image data as in the foregoing embodiments. The determiner (55) determines the output image data on the basis of the degree of fogging estimated. The output image data is transmitted to the communication terminal (60) via the Internet (N). The output image data may be transmitted to the communication terminal (60) via the server (50). The output image data may be transmitted to the communication terminal (60) via the other wireless communication than the methods described above, or via wired communication.

<Third Variation>

An air treatment system (1) of a third variation is configured such that a server (50) includes an estimator (54) and a determiner (55), as in the first embodiment illustrated in FIG. 1. The third variation is different from the first embodiment in terms of the control operations of the imaging unit (40) and the server (50).

The imaging device (41) of the imaging unit (40) captures an image of the imaging target (T) every predetermined period $\Delta T$, which is preset. The imaging device (41) repeats the image capturing of the imaging target (T) by the number of times Nset, which is preset. It is preferable that the predetermined period $\Delta T$ be 5 min or longer, but not longer than 23 hours. The number of times Nset is set to two times or more.

The predetermined period $\Delta T$ and Nset are set values, that may be changed as appropriate by the operator or the like. The predetermined period $\Delta T$ may be inconstant, so that the predetermined period $\Delta T$ is differently set in length of time for different time of the image capturing of the imaging device (41).

If the Nset is 3 times and the predetermined period $\Delta T$ for all times of the image capturing of the imaging device (41) are 6 hours constantly, the imaging device (41) performs the image capturing of the imaging target (T), for example, at 6:00 AM, 12:00 AM, and 6:00 PM. The image data acquired by the imaging unit (40) is output to the server (50) via the Internet (N). The storage (52) of the server (50) stores a plurality of pieces (in this example, three pieces) of image data therein.

The estimator (54) of the server (50) estimates each degree of fogging of the plurality of pieces of image data stored in the storage (52). In other words, the estimator (54) estimates each degree of fogging of the plurality of pieces of image data acquired through the image capturing of the imaging target (T) performed every predetermined period $\Delta T$. The determiner (55) determines, as the output image data, the piece of image data with the lowest degree of fogging from among the plurality of pieces of image data.

As described above, the imaging device (41) captures an image of the imaging target (T) every predetermined period $\Delta T$. In this example, the imaging device (41) performs the image capturing of the imaging target (T) every 6 hours. Therefore, it is highly possible that the plurality of pieces of image data acquired include a piece of image data with a degree of fogging equal to or lower than the predetermined level (for example, level 1). Accordingly, by determining as the output image data the piece of image data with the lowest degree of fogging from among the plurality of pieces of image data, it is possible to selectively output a piece of image data with a low degree of fogging.

<Fourth Variation>

Figure 12:
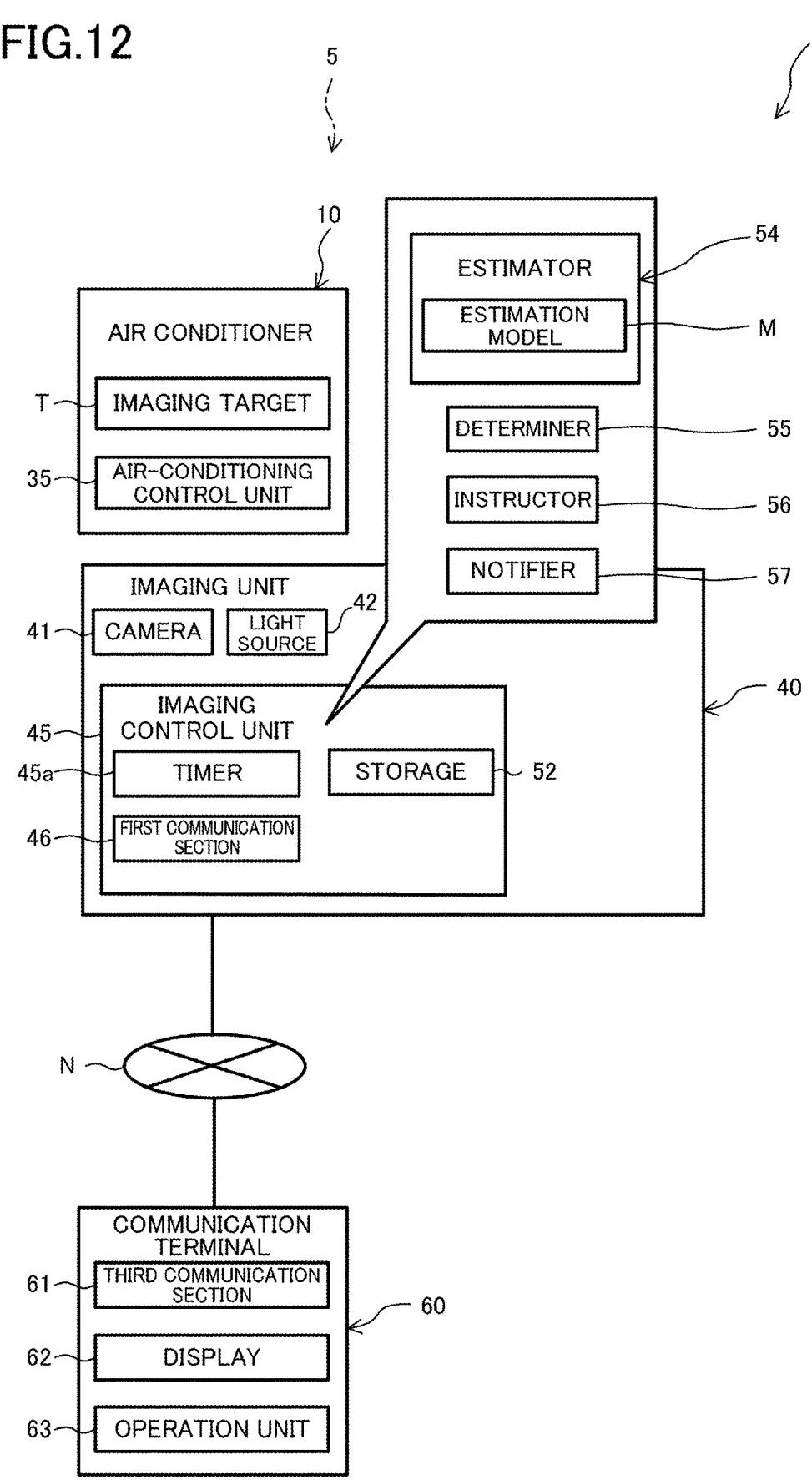
FIG. 12 is a view of a second variation, being equivalent to FIG. 1.

An air treatment system (1) of a fourth variation is configured such that an imaging unit (40) includes an estimator (54) and a determiner (55), as in the second variation illustrated in FIG. 12. In the fourth variation, the imaging unit (40) performs control operation similar to that in the third variation.

The imaging device (41) of the imaging unit (40) captures an image of the imaging target (T) every predetermined period ΔT, which is preset. The imaging device (41) repeats the image capturing of the imaging target (T) by the number of times Nset. The storage (52) of the imaging unit (40) stores therein such a plurality of pieces of image data.

The estimator (54) of the imaging unit (40) estimates each degree of fogging of the plurality of pieces of image data stored in the storage (52). In other words, the estimator (54) estimates each degree of fogging of the plurality of pieces of image data acquired by the image capturing of the imaging target (T) performed every predetermined period ΔT. The determiner (55) determines, as the output image data, a piece of image data with the lowest degree of fogging from among the plurality of pieces of image data.

The fourth variation also can output image data with a low degree of fogging as in the third variation.

Other Embodiments

The embodiments and variations described above may be modified as below within applicable scopes.

The imaging target (T) may be a component disposed in the casing (25) or may be a component disposed outside the casing (25). Examples of the imaging target (T) disposed in the casing (25) include a drain pump and a float switch arranged in the tray (26), an air heat exchanger (the indoor heat exchanger (22)), the total heat exchanger (72), the fan (23, 71), a filter for catching dust in the air, and so on.

The imaging device (41) may be provided in the outdoor unit (11). In this case, components in the outdoor unit (11) are the imaging targets (T) of the imaging device (41).

The imaging device is not limited to the camera (41) and may be an optical sensor, for example.

The image data to be acquired by the imaging device (41) is not limited to static images and may be moving images.

The air treatment device may be another device as long as the device has a casing through which air flows. The air treatment device may be a humidity controller, a ventilator, or an air cleaner. The humidity control apparatus controls the humidity of the air in the target space. The ventilator is configured to ventilate a target space. The air cleaner purifies air in the target space.

While the embodiments and variations thereof have been described above, it will be understood that various changes in form and details may be made without departing from the spirit and scope of the claims. The embodiments, the variations, and the other embodiments may be combined and replaced with each other without deteriorating intended functions of the present disclosure.

The ordinal numbers such as "first," "second," "third," . . . , described above are used to distinguish the terms to which these expressions are given, and do not limit the number and order of the terms.

INDUSTRIAL APPLICABILITY

The present disclosure is usefully applicable to an image processing device, an air treatment system, an image processing program, and an image processing method.

EXPLANATION OF CHARACTERS

10 Air Conditioner (Air Treatment Device)
23 Indoor Fan (Fan)
25 Casing
26 Tray (Imaging Target)
27 Pump (Imaging Target)
41 Camera (Imaging Device)
45 Image Processing Device
50 Server (Image Processing Device)
52 Storage
54 Estimator
55 Determiner
56 Instructor
57 Notifier
71 Air Supply Fan (Fan)
73a Humidifying Element (Imaging Target)
T Imaging Target

The invention claimed is:

1. An image processing device, comprising:
an estimator configured to estimate a degree of fogging of image data on the basis of the image data, the image data having been acquired by an imaging device capturing an image of an imaging target disposed in a casing of an air treatment device; and
a determiner configured to determine output image data on the basis of the degree of fogging of the image data estimated by the estimator, the output image data being image data to be output,
the degree of fogging being indicative of how much the image data is fogged up due to mists generated in the casing.

2. An image processing device of claim 1, wherein, comprising:
an estimator configured to estimate a degree of fogging of image data on the basis of the image data, the image data having been acquired by an imaging device capturing an image of an imaging target disposed in a casing of an air treatment device;
a determiner configured to determine output image data on the basis of the degree of fogging of the image data estimated by the estimator, the output image data being image data to be output; and
an instructor configured to output a first instruction if the degree of fogging of the image data estimated by the estimator is higher than a predetermined level, the first instruction instructing the imaging device to capture an image of the imaging target,
if the degree of fogging of the image data estimated by the estimator is higher than the predetermined level, the instructor outputs a second instruction before the first instruction, the second instruction instructing the air treatment device to activate a fan or to operate the fan at a greater air rate.

3. An image processing device of claim 1, wherein, comprising:
an estimator configured to estimate a degree of fogging of image data on the basis of the image data, the image data having been acquired by an imaging device capturing an image of an imaging target disposed in a casing of an air treatment device;
a determiner configured to determine output image data on the basis of the degree of fogging of the image data estimated by the estimator, the output image data being image data to be output;
an instructor configured to output a first instruction if the degree of fogging of the image data estimated by the estimator is higher than a predetermined level, the first instruction instructing the imaging device to capture an image of the imaging target; and a storage configured to store therein the image data acquired by the imaging device, wherein the determiner determines the output image data on the basis of each degree of fogging of a plurality of pieces of image data stored in the storage, and the determiner determines the output image data on the basis of the number of times of image capturing performed by the imaging device and each degree of fogging of the plurality of pieces of image data.

4. The image processing device of claim 1, wherein the determiner determines, as the output image data, a piece of image data with a degree of fogging equal to or lower than a predetermined level.

5. The image processing device of claim 1, wherein the degree of fogging of the image data estimated by the estimator is three- or more leveled, and the determiner determines, as the output image data, a piece of image data whose degree of fogging is the lowest level.

6. The image processing device of claim 1, further comprising:

an instructor configured to output a first instruction if the degree of fogging of the image data estimated by the is higher than a predetermined level, the first instruction instructing the imaging device to capture an image of the imaging target.

7. The image processing device of claim 2, wherein if the degree of fogging of the image data estimated by the estimator is higher than the predetermined level, the instructor outputs the first instruction after a predetermined period has elapsed.

8. The image processing device of claim 7, wherein the predetermined period is 5 min or longer, but not longer than 23 hours.

9. The image processing device of claim 2, further comprising:

a storage configured to store therein the image data acquired by the imaging device, wherein the determiner determines the output image data on the basis of each degree of fogging of a plurality of pieces of image data stored in the storage.

10. The image processing device of claim 2, further comprising:

a notifier configured to notify of abnormality if the number of times of image capturing performed by the imaging device exceeds a predetermined number of times.

11. The image processing device of claim 1, wherein the estimator estimates each degree of fogging of the plurality of pieces of image data acquired by the imaging device capturing an image of the imaging target every predetermined period, and the determiner determines, as the output image data, a piece of image data with the lowest degree of fogging from among the plurality of pieces of image data.

12. The image processing device of claim 1, wherein the estimator includes an estimation model, which has machine-learned to be capable of estimating the degree of fogging of the image data.

13. An air treatment system, comprising:

an air treatment device including a casing and an imaging target;

the imaging device; and an image processing device of claim 1, comprising:

an estimator configured to estimate a degree of fogging of image data on the basis of the image data, the image data having been acquired by an imaging device capturing an image of an imaging target disposed in a casing of an air treatment device; and a determiner configured to determine output image data on the basis of the degree of fogging of the image data estimated by the estimator, the output image data being image data to be output, the degree of fogging being indicative of how much the image data is fogged up due to mists generated in the casing.

14. The air treatment system of claim 13, further comprising:

a heat exchanger provided in an air flow path and configured to cool air, the imaging device being provided in a space lateral to the heat exchanger in the air flow path, or in a space in an upstream of the heat exchanger in the air flow path.

15. A non-transitory computer readable medium storing an image processing program for causing a computer to execute:

estimating a degree of fogging of image data on the basis of the image data, the image data having been acquired by an imaging device capturing an image of an imaging target in a casing of an air treatment device; and determining output image data on the basis of the degree of fogging of the image data estimated, the output image data being image data to be output, the degree of fogging being indicative of how much the image data is fogged up due to mists generated in the casing.

16. An image processing method, comprising:

estimating a degree of fogging of image data on the basis of the image data, the image data having been acquired by an imaging device capturing an image of an imaging target in a casing of an air treatment device; and determining output image data on the basis of the degree of fogging of the image data estimated, the output image data being image data to be output, the degree of fogging being indicative of how much the image data is fogged up due to mists generated in the casing.

* * * * *